United States Patent [19]

Gooding et al.

[11] B 3,999,052
[45] Dec. 21, 1976

[54] UPPER BOUNDS ADDRESS CHECKING SYSTEM FOR PROVIDING STORAGE PROTECTION FOR A DIGITAL DATA PROCESSOR

[75] Inventors: David N. Gooding, Endicott; Everett M. Shimp, Endwell, both of N.Y.

[73] Assignee: International Business Machines Corporation, Armonk, N.Y.

[22] Filed: June 18, 1975

[21] Appl. No.: 587,936

[44] Published under the second Trial Voluntary Protest Program on March 23, 1976 as document No. B 587,936.

[52] U.S. Cl. .................. 235/153 AM; 235/175; 340/172.5
[51] Int. Cl.$^2$ .................. G06F 7/385; G11C 8/00
[58] Field of Search ......... 235/153 AM, 175; 445/1

[56] References Cited
UNITED STATES PATENTS 3,639,912   2/1972   Campbell ............ 340/172.5

OTHER PUBLICATIONS

Enger, T. A. Range Check of an Address Counter, in IBM Tech. Disc. Bull., 16(7): Dec. 1973, pp. 2136–2137.

*Primary Examiner*—R. Stephen Dildine, Jr.
*Attorney, Agent, or Firm*—Richard E. Bee

[57] ABSTRACT

Data processing circuitry for performing two serially related arithmetic operations during one and the same machine control cycle and employing an independent zone parallel type arithmetic unit capable of simultaneously performing independent arithmetic operations in the different zones thereof. Data transfer circuitry is provided for immediately supplying the output result of a first arithmetic unit zone back to the input of a second arithmetic unit zone for immediately producing a second and different result. Such transfer circuitry is constructed to operate in an asynchronous manner so that the first result is supplied back to the input of the second arithmetic unit zone as soon as it becomes available at the output of the first arithmetic zone. Thus, a second result, which is dependent on the first result, is produced during the same machine control cycle as the first result. This data processing circuitry is particularly useful for providing storage protection for a data processor. In such case, the current storage address and a requested storage access length value are supplied to the first arithmetic unit zone for producing a new address representing the upper extent of the storage access request. The resultant new address is immediately supplied back to the input of the second arithmetic unit zone for combining same with an upper limit address for immediately producing an upper bounds extent error when the new address exceeds the upper limit address.

10 Claims, 6 Drawing Figures

| 5FFF | UPDATED ADDRESS |
|---|---|
| A001 | COMPLEMENT |
| 6000 | UPPER BOUNDARY |
| 0001 | SUM |

CY=1

| 6000 | UPDATED ADDRESS |
|---|---|
| A000 | COMPLEMENT |
| 6000 | UPPER BOUNDARY |
| 0000 | SUM |

CY=1

| 6001 | UPDATED ADDRESS |
|---|---|
| 9FFF | COMPLEMENT |
| 6000 | UPPER BOUNDARY |
| FFFF | SUM |

CY=0

UPPER BOUNDS ADDRESS CHECKING SYSTEM FOR PROVIDING STORAGE PROTECTION FOR A DIGITAL DATA PROCESSOR

CROSS-REFERENCE TO RELATED APPLICATION

The present invention makes use of the novel independent zone arithmetic unit described and claimed in copending U.S. Pat. application Ser. No. 573,656, filed May 1, 1975, and entitled "Parallel Digital Arithmetic Device Having a Variable Number of Independent Arithmetic Zones of Variable Width and Location," the applicants and assignee for this copending application being the same as for the present application. For sake of brevity, such independent zone arithmetic unit will be described only in a general manner herein. For additional details, reference should be made to the copending application. The description set forth in such copending application is hereby incorporated in the present application by this reference thereto.

BACKGROUND AND SUMMARY OF THE INVENTION

This invention relates to data processing circuitry for use in the arithmetic and logic sections of digital computers and digital data processors. This invention is particularly useful in providing a novel storage protection system for a data processor and hence will be described primarily in that context.

As is known, it is frequently desirable to restrict access to various storage areas in the data storage system associated with a digital data processor to particular authorized users. This is done primarily for data security and data integrity reasons. In particular, in a large scale data storage system, a certain storage area may be assigned to a particular user or customer and it is desirable to prevent other users or customers from gaining access to or disturbing the data in such storage area. In other words, it is often desirable to protect certain storage areas so as to prevent the use of the data stored therein by unauthorized persons.

Various storage protection systems have been heretofore proposed. One such system makes use of storage protection keys or codes which are used to protect known fixed size storage areas. In order to gain access to a particular one of these fixed size storage areas, the user must initially enter the proper protection key or protection code. Such a system performs quite satisfactorily but suffers from the disadvantage that is limited to use with storage areas of predetermined fixed size. In a goodly number of cases, it would be desirable to instead protect storage areas of various different sizes and to be able to change the sizes and locations of the protected areas from time to time.

Another previously proposed form of storage protection involves the use of upper and lower boundary limits which can be assigned to a particular storage area of a desired selectable size. To initially gain access to the protected storage area, the user must submit the proper identification code. Thereafter, a mechanism within the data processor is used to examine subsequently submitted storage address requests to ensure that they lie within the range set by the upper and lower address limit boundaries. If the user attempts to go beyond either of these boundaries, the data processor stops processing his requests and gives him an out-of-bounds signal. Such boundary limit systems provide the flexibility lacking in the protection key systems. The previously proposed boundary limit type systems, however, have substantial room for improvement in terms of the time required to perform the storage address checking function.

The present invention provides a unique combination of data processing circuitry which can be used to significantly reduce the time required of the data processor for performing the storage address checking function in a boundary limit type storage protection system. This is accomplished by providing data processing circuitry for performing two serially related arithmetic operations during one and the same machine control cycle. With this circuitry, the upper boundary address checking function is performed in parallel with and during the same machine cycle used for the accessing of the data into or out of the storage system.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENT

Figure 1:
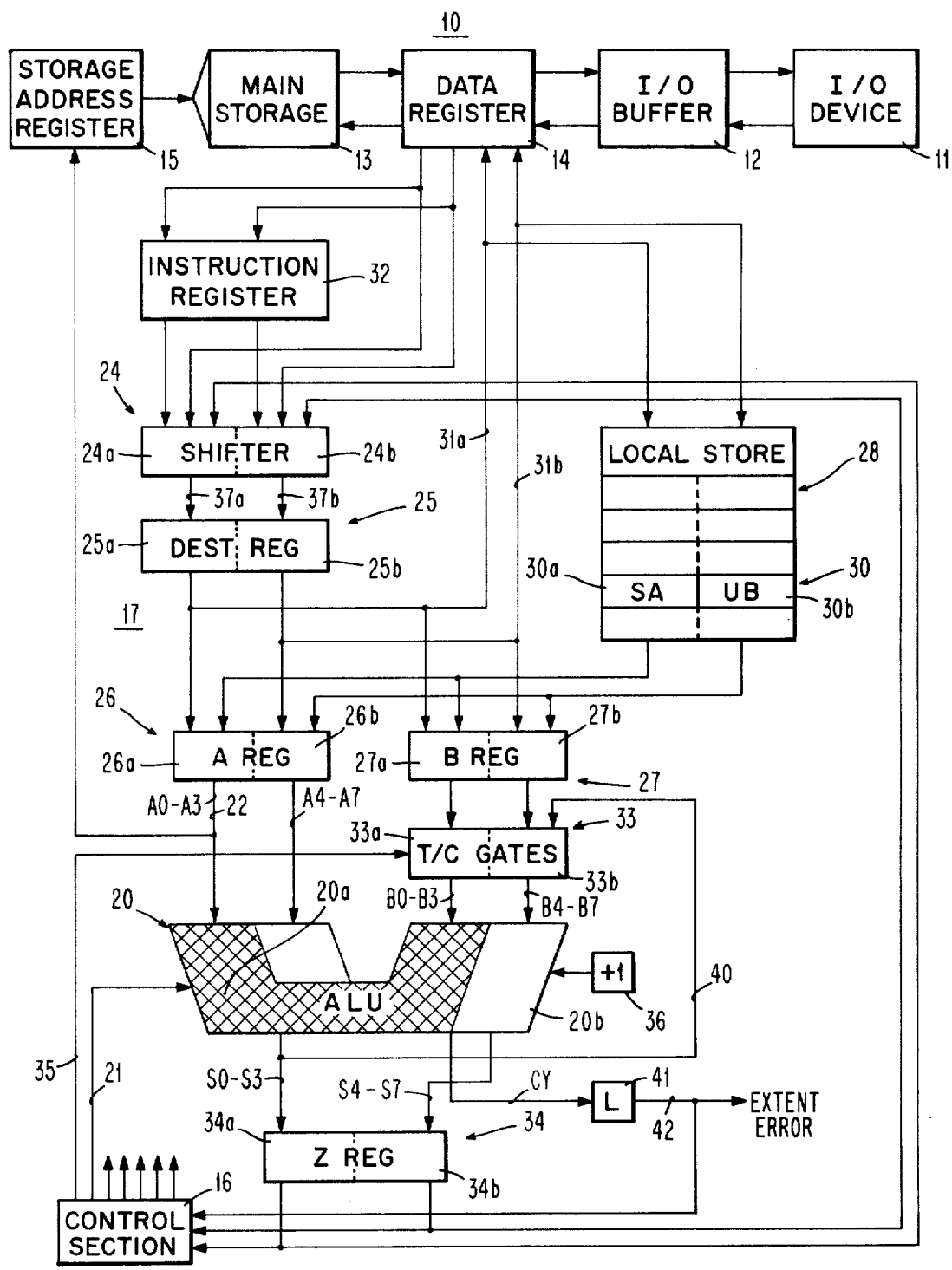
FIG. 1 is a functional block diagram of a representative digital data processor and showing incorporated therein data processing circuitry constructed in accordance with the present invention.

Referring to FIG. 1 of the drawings, there is shown a data processor 10 for processing data represented by sequences of binary digits or bits. It is assumed herein that the data bits in these binary bit sequences are grouped into eight-bit groups and each such eight-bit group is called a "byte." The data processor 10 can be thought of as being composed of the classical input-/output, storage, processing and control sections. The input/output (I/O) section is represented by an I/O device 11 and an I/O buffer 12. The storage section includes main storage 13, a data register 14 and a storage address register 15. The control section is represented at 16. The remainder of the units shown in FIG. 1 are included in the processing section, such section being represented as a whole by reference numeral 17.

Figures 2, 4, 5, 6:
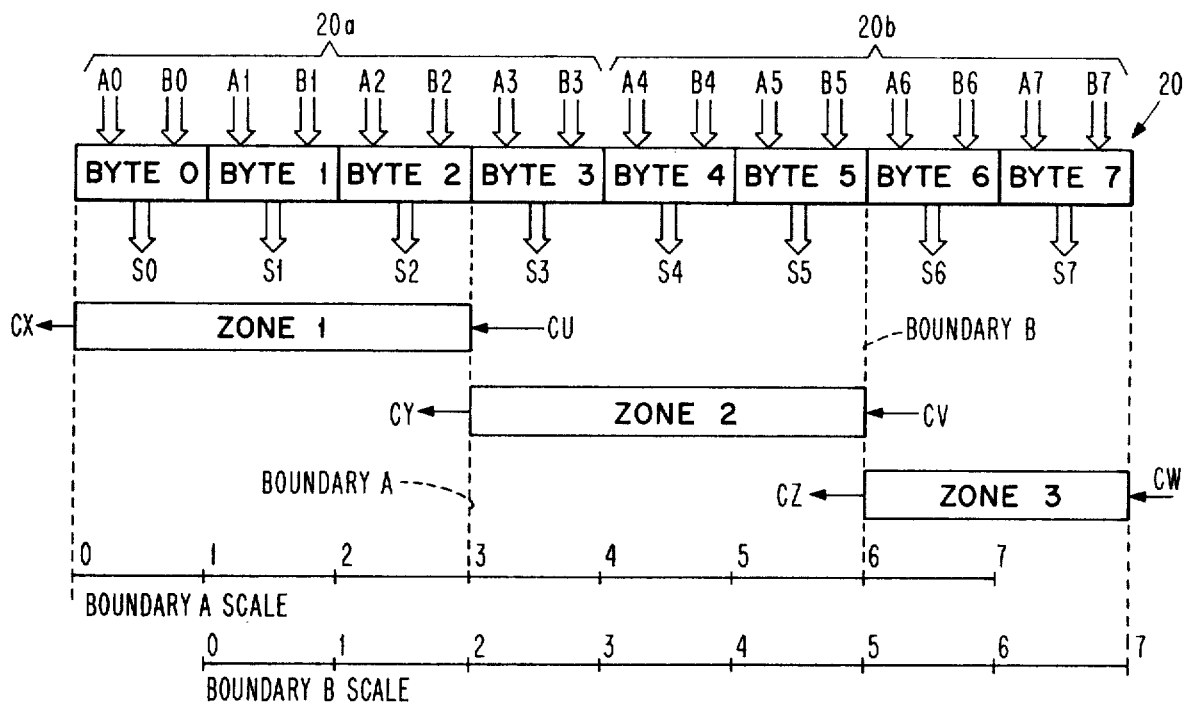
FIG. 2 is a diagram describing in greater detail the construction and operation of the independent zone parallel binary arithmetic circuitry represented by the ALU 20 of FIG. 1.
FIGS. 4–6 are charts used in explaining the operation of the data processing circuitry of FIG. 1.

An arithmetic and logic unit (ALU) 20 represents the heart of the processing section 17. The ALU 20 is comprised of independent zone parallel binary arithmetic circuitry of the kind described in the above cross-referenced related application Ser. No. 573,656. For sake of specific example herein, it is assumed that the ALU 20 takes the form of one of the binary adder embodiments described in this cross-referenced application. With this in mind, the general nature of the ALU 20 is shown in greater detail in FIG. 2. With reference to FIG. 2, the ALU 20 of the present embodiment is a parallel binary adder having a relatively wide overall data flow width of eight bytes (bytes 0–7) and a pair of adjustable boundary mechanisms, designated as boundary A and boundary B, for subdividing the ALU or adder 20 into plural independent operating zones of variable width and variable location. Depending on the placement of boundaries A and B, anywhere from one to three independent operating zones may be obtained. Independent external carry-in lines CU, CV and CW and independent external carry-out lines CX, CY and CZ are provided for the three independent operating zones, and the connecting points for such carry-in and carry-out lines are automatically shifted in step with the movement of the zone boundaries A and B. Thus, the connecting point for the CU carry-in line for zone 1 and the connecting point for the CY carry-out line for zone 2 are shifted in step with the movement of boundary A, while the CV carry-in line for zone 2 and the CZ carry-out line for zone 3 move in step with the movement of boundary B.

Each one-byte section of the adder 20 includes eight parallel binary bit stages. Thus, the overall data flow width of the adder 20 is 64 bits. The order of significance of the bits and bytes increases from right to left. Thus, for example, byte 0 is the highest order or most significant byte, while byte 7 is the lowest order or least significant byte. Each one-byte section (for example, byte 0) is capable of adding a first eight-bit input operand (for exampe, A0 for byte 0) to a second eight-bit input operand (for example, B0 for byte 0) to produce a resultant eight-bit sum (for example, S0 for byte 0).

For the representative operation to be described herein, it is assumed that the control circuitry included within the ALU 20 is set to subdivide the ALU 20 into two independent operating zones, each having a width of four bytes. This setting is determined by boundary control signals supplied from the control section 16 to the ALU 20 by way of control bus 21 (FIG. 1). With respect to FIG. 2, it is assumed that boundary A and boundary B are set so that zone 1 covers bytes 0 through 3, and zone 2 covers bytes 4 through 7. This is accomplished by setting boundary A at the dividing line between bytes 3 and 4 (boundary A scale location 4) and by setting boundary B at the right-hand extremity of the adder 20 (boundary B scale position 7). In this case, zone 3 disappears. The higher order or zone 1 half of the arithmetic circuitry 20 is designated as 20a and the lower order or zone 2 half is identified as 20b.

With this boundary setting, the higher and lower order halves 20a and 20b funtion as independent first and second arithmetic units. The higher order arithmetic unit 20a operates to add a first four-byte operand (A0 –A3) to a second four-byte operand (B0–B3) to form a resultant four-byte sum (S0–S3). In a similar manner, the lower order arithmetic unit 20b operates to add a first four-byte operand (A4–A7) to a second four-byte operand (B4–B7) to form a resultant four-byte sum (S4–S7).

In FIG. 1, the higher order arithmetic zone 20a is represented by the shaded area, while the lower order arithmetic zone 20b is represented by the unshaded area. With respect to FIG. 1, input bytes A0–A7 are supplied to the left side or A side input of the ALU 20, while input bytes B0–B7 are supplied to the right side of B side input of the ALU 20. Result bytes S0–S7 appear at the output side or bottom side of ALU 20. For simplicity of illustration, the 32 input or output conductors for each four-byte group of data bits is represented by a single line in FIG. 1, such line denoting a 32-conductor data bus. Thus, for example, the 32 data bits for input bytes A0–A3 are carried by a 32-conductor data bus 22.

Data is written into the main storage 13 by first placing same in the data register 14 and by placing the proper storage address in the storage address register 15. Data is read out of the main storage 13 by placing the proper address in the storage address register 15 and then transferring the data at that address into the data register 14. Storage is addressable on a byte basis or, in other words, each byte location in main storage 13 has its own unique address. In the present embodiment, anywhere from one to eight bytes may be accessed at any given instant.

Assuming for the moment that data is being read from the main storage 13 for purposes of processing same in the processing section 17, such data is transferred to the data register 14 during successive storage read instruction cycles. Assuming the readout mechanism to have a data flow width of eight bytes, then anywhere from one to eight bytes is transferred to the data register 14 during any given storage read cycle. For processing purposes, the data in data register 14 is transferred by way of a shifter unit 24 to a destination register 25. The data in the destination register 25 is subsequently transferred to either an A register 26, a B register 27 or to one of several general purpose or special purpose registers or storage locations in a local storage subsection 28. A typical general purpose register in this subsection 28 is indicated at 30. As indicated, various additional registers or storage locations are also located in this subsection 28. The data in the destination register 25 may also be transferred back to the data register 14 by way of four-byte data buses 31a and 31b. If the data in data register 14 is a program instruction, then it is also transferred to and set into the instruction register 32.

The data in A register 26 is supplied to the left side or A side input of the ALU or arithmetic unit 20. The data in B register 27 is supplied by way of true/complement (T/C) gates 33 to the right side or B side input of the arithmetic unit 20. The resultant data appearing at the output of arithmetic unit 20 is supplied to a Z register 34. The data in Z register 34 may be transferred to either or both of control section 16 and shifter 24. The true/complement gates 33 may pass the data in the B register 27 to the arithmetic unit 20 in either true or one's complement form, depending on the settings of the control signals supplied thereto from the control section 16 by way of the control lines in a control bus 35. The controls for the two portions 33a and 33b of the T/C gates 33 are independent of one another so that independent gating and T/C functions can be specified for the two portions. When doing a subtraction operation, a +1 carry-in is supplied to the arithmetic unit 20 by a +1 circuit 36. This +1 carry-in can be supplied on either or both of the CU and CV carry-in lines (FIG. 2) depending upon the specified ALU function for each of the separate arithmetic zones 20a and 20b.

Each of units 24–27, 30, 33 and 34 has a data flow width of eight bytes. Thus, each of these units includes 64 binary data bit stages. The bit stages which handle the higher order four bytes are identified by the suffix letter a, while the bit stages which handle the lower order four bytes are identified by the suffix letter b. The data buses running between these units and to and from the arithmetic unit 20 each includes a set of 32 data conductors or data lines. Thus, for example, each of the four-byte data buses 37a and 37b running between the shifter 24 and the destination register 25 includes 32 data conductors. Data bus 37a interconnects the higher order stages 24a and 25a, while data bus 37b interconnects the lower order stages 24b and 25b. Each of the 32-conductor data buses shown in FIG. 1 has associated therewith a set of 32 control gates for enabling or disabling the flow of data along such data bus. As is customary in the computer art and for sake of simplicity, such data flow control gates are not specifically indicated in the drawing.

The data processing circuitry of FIG. 1 also includes circuitry for supplying first and second operands to the first arithmetic zone (shaded zone 20a in FIG. 1) of the arithmetic unit 20 for producing a first result. This input operand circuitry includes the higher order half 26a of A register 26 for supplying a first operand to the higher order left side input of the arithmetic unit 20 and the higher order half 27a of the B register 27 for supplying a second operand to the higher order right side input of the arithmetic unit 20, this second operand being supplied by way of the higher order half 33a of the true/complement gates 33.

The data processing circuitry of FIG. 1 further includes data conveying circuitry or data transfer circuitry connected to the output of the first arithmetic zone (shaded zone 20a in FIG. 1) of the arithmetic unit 20 for immediately supplying the first result back to the input of the second arithmetic zone (unshaded zone 20b in FIG. 1) for immediately producing a second and different result. This data transfer circuitry includes a four-byte data bus 40 which is connected to the higher order output (result bytes S0–S3) of the arithmetic unit 20 and which runs to the input of the lower order half 33b of the true/complement gates 33. This data transfer circuitry also includes the lower order half 33b of the true/complement gates 33 and the data bus for operand bytes B4–B7 which runs from the lower order T/C gates 33b to the right side input for the lower order half 20b of the arithmetic unit 20. With respect to the operation to be described hereinafter, it should be noted that the data flow control gates (not shown) which control the flow of data on the data buses which run to the lower order T/C gates 33b are operated such that data bus 40 is enabled to pass data to the T/C gates 33b while the data bus from B register portion 27b is disabled or prevented from supplying data to T/C gates 33b.

The data transfer circuitry, represented by data bus 40 and the lower order T/C gates 33b, is constructed to operate in an asynchronous manner such that the first result (result bytes S0–S3) is supplied back to the input of the second arithmetic zone (unshaded portion 20b) as soon as it becomes available at the output of the first arithmetic zone (shaded portion 20a) of the arithmetic unit 20. Thus, this data transfer circuitry is free of registers, latches and other mechanisms controlled by timing signals. In this regard, the true/complement gates 33 are "flow through" type devices wherein data bits supplied to the inputs thereof flow on through to the outputs as quickly as their circuit delays will allow and without having to wait on any timing signals. The same, incidentally, is also true of the arithmetic unit 20, that is, the data circuits therein are also of the "flow through" type. By way of contrast, the destination register 25, the A register 26, the B register 27 and the Z register 34 are controlled by timing pulses from the control section 16 which control the times at which new data can be set into these registers. Once data is set into one of these registers, it remains in such register until replaced by new data during a subsequent timing pulse. This provides a synchronous or timed type of operation for these register units.

As previously indicated, the present invention is particularly useful as an upper bounds address checking mechanism for providing storage protection for selected areas within the main storage 13. When so used, the processing circuitry shown in FIG. 1 can be considered as including update circuitry for supplying both the current storage address and a requested storage access length value to the first arithmetic zone 20a of the arithmetic unit 20 for addition therein for producing a new or updated storage address representing the upper extent of the storage access request. As will be seen, the current storage address is located in the higher order half 30a of the local storage register 30. "SA" denotes "storage address." This current storage address is supplied to the left side input of the first arithmetic unit zone 20a by way of the higher order half 26a of the A register 26. The requested storage access length value, on the other hand, is initially located in the instruction register 32. Such access length value is supplied to the right side input of the higher order half of the arithmetic unit 20 by way of the higher order halves of shifter 24, destination register 25, B register 27 and T/C gates 33. The higher order arithmetic unit half 20a is set to add the current storage address to the access length value so as to cause the higher order output bytes S0–S3 to represent the new or updated storage address. In this regard, the higher order T/C gates 33a are set to supply the access length value to the right side input of arithmetic unit 20a in true form.

The upper bounds address checking mechanism also includes limit checking circuitry for supplying both the upper limit address and the new or updated address produced by the higher order arithmetic unit zone 20a to the second or lower order arithmetic unit zone 20b for producing an indication of whether the new address exceeds the upper limit address. This limit checking circuitry includes the lower order half 30b of the local storage register 30 for supplying the upper limit or upper bound address to the left side input of the lower order arithmetic unit zone 20b by way of the lower order half 26b of A register 26. "UB" denotes "upper bound." This limit checking circuitry also includes the four-byte data bus 40 and the lower order half 33b of the true/complement gates 33 for supplying the new or updated address to the right side input of the lower order arithmetic unit zone 20b. During this limit checking operation, the lower order half 27b of B register 27 is prevented from supplying data to the lower order half 33b of the T/C gates 33. In the present embodiment, the lower order T/C gates 33b are set to supply the complement of the new or updated address to the right side input of the lower order arithmetic unit zone 20b. Also, the +1 circuit 36 is operated to supply a +1 carry-in signal to the lowest order bit position in the lower order arithmetic unit zone 20b. This is accomplished by way of carry-in line CV shown in FIG. 2.

It is noted in passing that if the arithmetic unit 20 includes an odd number of polarity inverting stages such that its output is inverted or complemented relative to its input, then the lower order T/C gates 33b should instead be set to supply the new address to the arithmetic zone 20b in true form and the +1 carry-in to the 20b zone should be disabled. For the present embodiment, it is assumed that the arithmetic unit 20 does not include such an odd number of inverting stages in its input-to-output path.

The upper bounds address checking mechanism further includes circuitry responsive to the carry-out signal CY for the lower order arithmetic unit zone 20b for producing an upper bounds extent error signal when the new or updated address exceeds the upper bound address. This circuitry includes the CY carry-out line, a latch circuit 41 and a latch circuit output line 42. The latch circuit 41 provides a temporary memory for the CY carry-out signal and the extent error signal appears on the latch circuit output line 42. The extent error signal is also supplied to the control section 16 for discontinuing the normal data processing operations and instituting the proper error handling routine.

Figure 3:
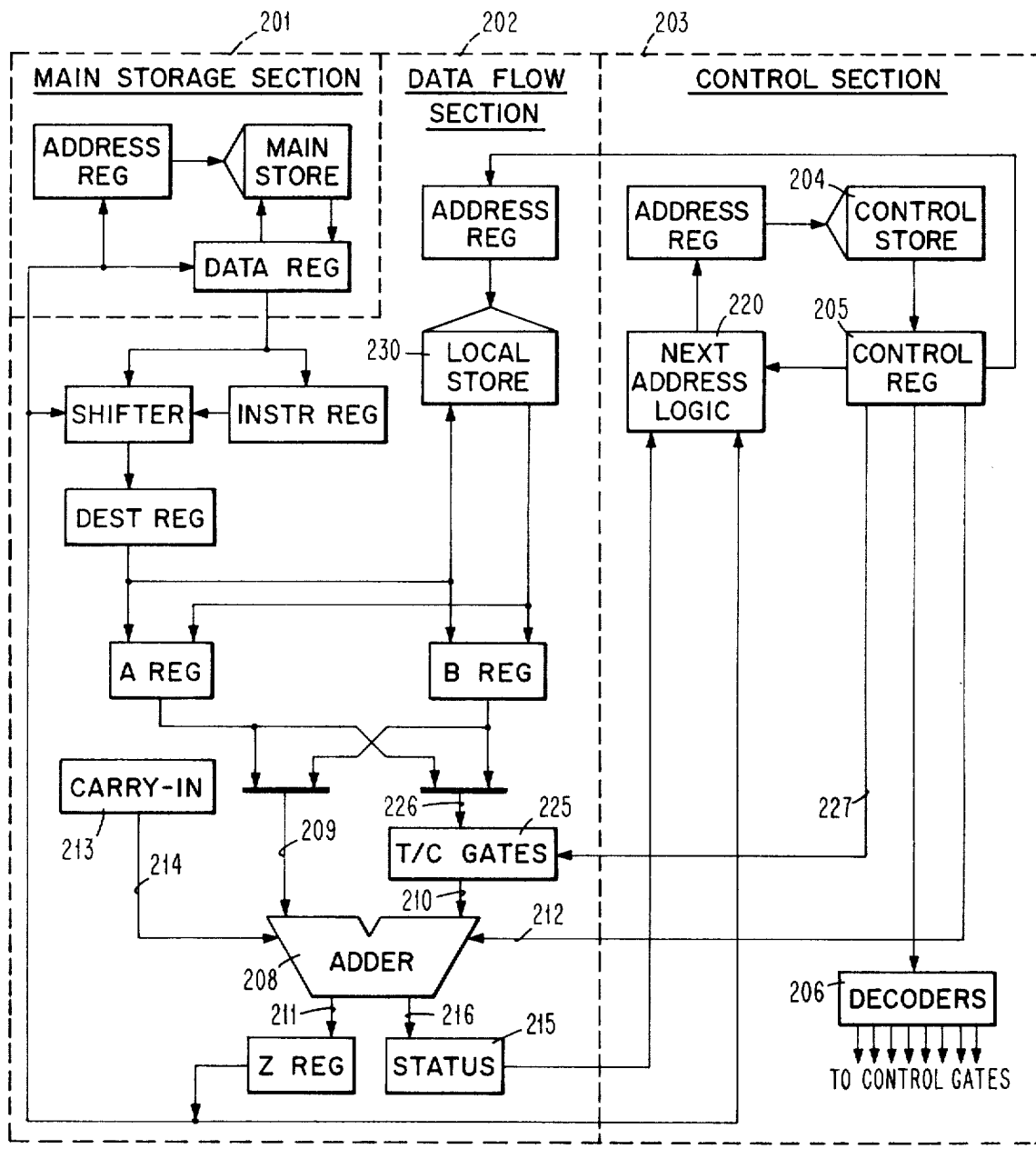
FIG. 3 is a functional block diagram of a digital data processor similar to the one shown in FIG. 1, but describing in greater detail the construction of a representative form of control section and its relationship to the other functional units.

Control section 16 may be of either the microprogrammed type or the "all hardware" (nonmicroprogrammed) type. FIG. 3 shows in greater detail the construction of the control section 16 for the case where it is of the microprogrammed type. The control section 203 of FIG. 3 corresponds to the control section 16 of FIG. 1. Also, the adder 208 of FIG. 3 corresponds to the arithmetic unit 20 of FIG. 1. The local storage register 30 in FIG. 1 would, in the case of the FIG. 3 embodiment, take the form of one of the storage locations in the local storage 230. The embodiment of FIG. 3 is described in greater detail in the above cross-referenced related application Ser. No. 573,656.

OPERATION OF THE PREFERRED EMBODIMENT

The operation of the FIG. 1 embodiment will now be described for the case of providing the upper bounds check on the address updating for the main storage 13. As previously indicated, this address checking is used to provide a flexible form of storage protection for protecting various areas in the main storage 13. To initially gain access to a protected storage area, the user submits the proper user identification code together with an identifier for the area to which access is sought and a request for access to such area. The data processor 10 then consults a storage protection table stored in the main storage 13 and determines whether the user has submitted the proper user identification code for the requested storage area. If he has, then the data processor 10 transfers from the main storage 13 and sets into the local storage register 30 the starting address and the upper boundary address for the protected storage area and thereafter honors requests for writing data into or reading data out of this protected storage area. The initial or starting address for the protected area is set into the higher order four-byte half 30a of the register 30, while the upper limit or upper bound address is set into the lower order four-byte half 30b of the register 30. The authorized user may thereafter access the protected storage area defined by these boundary limits.

Assuming that such access is to start with the initial starting address for the protected area, the accessing operation is commenced by transferring the appropriate storage read or storage write instruction to the data register 14, either from a user program stored in another area in the main storage 13 or by means of an external request by way of the I/O buffer 12. This access instruction is then transferred to the instruction register 32. Such instruction includes, among other things, an operation code, a storage area code and an access length code. The operation code indicates whether the operation is a read operation or a write operation and the access length code designates the length of data (number of bytes) to be read or written. The operation code portion of the instruction is also supplied to the control section 16. In response thereto, the control section 16 sends control signals to the arithmetic unit 20 via control bus 21 which cause the boundary mechanism inside the arithmetic unit 20 to divide the arithmetic unit 20 into the two independent four-byte arithmetic zones 20a and 20b. The control section 16 also sends control signals to the true/complement gates 33 via control bus 35 for causing the higher order half 33a to transfer data in true form and for causing the lower order half 33b to transfer data in inverted or one's complement form.

At the next step in the storage access cycle, the storage access length value in instruction register 32 is set into the higher order half 25a of the destination register 25. Then the current storage address, in this case the starting storage area address, in the higher order half 30a of local storage register 30 is transferred to the higher order half 26a of the A register 26, the upper boundary address in lower order half 30b is transferred to the lower order A register half 26b and the access length value in the higher order half 25a of destination register 25 is transferred to the higher order half 27a of the B register 27. The current storage address in the higher order A register half 26a is immediately sent to the storage address register 15 to commence the accessing action for the main storage 13. At the same time, the current storage address in A register half 26a and the access length value in B register half 27a are sent to the arithmetic unit 20. As mentioned, the T/C gate half 33a supplies the access length value in true form. The arithmetic unit 20 adds these two input operands to produce at the higher order output half thereof (bytes S0–S3) a new or updated address value. This new address value is set into the higher order Z register half 34a.

As soon as it appears at the higher order output of the arithmetic unit 20, the new address value is immediately sent back to the input side of the lower order arithmetic unit half 20b by way of the four-byte data bus 40 and the lower order T/C gate half 33b. The lower order T/C gate half 33b is set to supply the one's complement of the new address value to the right side input of the arithmetic unit half 20b. At the same time, the upper limit or upper bound address in the lower order A register half 26b is being supplied to the left side input of the lower order arithmetic unit half 20b. The lower order arithmetic unit half 20b operates to add the one's complement of the new address value to the upper bound address value, a +1 carry-in being supplied by the +1 circuit 36 to the CV carry-in line. Because of the +1 carry-in, the arithmetic unit half 20b produces an output result (bytes S4–S7) which represents the sum of the upper bound value and the two's complement of the new address value. This result is, of course, the same as would be obtained by subtracting the new address from the upper bound address. Thus, the result from the lower order arithmetic unit half 20b represents the true subtraction or true difference of the new address value from the upper bound address value. This difference value, however, is not used in the present embodiment and hence is of no further interest. The upper limit extent checking is instead provided by looking at the carry-out signal CY for the lower order arithmetic unit half 20b. The absence of a carry-out (CY = 0) indicates an upper limit extent error (new address greater than upper bound address), while the presence of a carry-out (CY = 1) indicates that the new address is still less than the upper boundary limit.

The reason the CY carry-out status can be used to provide an extent error can be seen with the aid of the examples shown in FIGS. 4–6. For sake of simplicity, hexadecimal (base 16) notation is used in these examples in place of the actual binary values. In all three examples, it is assumed that the upper boundary limit value is "6000" in hexadecimal notation or "24,576" in decimal notation. In the first case represented in FIG. 4, the new address has a value of "5FFF" (24,575 in decimal), which is, of course, less than the upper limit. The 16's complement of 5FFF is A001. Adding this 16's complement to the upper limit value gives 0001 plus a carry-out to the next higher order digit position. In general, whenever the new address value is smaller than the upper limit, the complement of the new address value will always be big enough to produce a carry-out.

FIG. 5 represents the case where the new address is exactly equal to the upper limit address. In this case, the 16's complement is "A000" and the sum is "0000" with a carry-out to the next digit position. FIG. 6 shows the case where the new address is one greater than the upper limit address. In this case, the 16's complement is "9FFF" and the sum is "FFFF" with no carry-out. Thus, when the new address representing the upper extent of the storage access request is larger than the upper limit, the complement will be too small to produce a carry-out. Thus, the absence of a carry-out (CY = 0) indicates an upper boundary extent error.

The actual hardware shown in FIG. 1 operates, of course, with binary numbers and not hexadecimal numbers. Nevertheless, the same result occurs and for the same reasons as for the hexadecimal notation examples in FIGS. 4–6. If the new address is smaller than or equal to the upper limit, then the complement thereof is large enough to produce a carry-out. Conversely, if the new address is larger than the upper limit, then the complement is too small to produce a carry-out.

The CY carry-out status is set into the latch circuit 41. The output of latch circuit 41 provides the extent error indication. If the binary signal level on the latch output line 42 indicates the occurrence of an extent error, such occurrence is immediately sent to the control section 16. Upon receipt of same, the control section 16 immediately discontinues the storage accessing operations and discontinues the processing of the user program or the honoring of external I/O requests, as the case may be. The external user or machine operator, as the case may be, is notified of this action and the reason for same. Thus, the user is prevented from exceeding his authorized boundary limit and thus is prevented from gaining access to a neighboring storage area for which he does not have the proper authorization.

If no boundary extent error occurs, then the new address value in the higher order Z register half 34a is sent back by way of the shifter half 24a and destination register half 25a to the local storage register half 30a to replace the previous address with the new updated address. This places the processing section 17 in the proper condition to process the next storage access instruction. So long as no boundary extent error occurs, subsequent storage access instructions will be processed in the same manner as described above, with the current address in register 30a being replaced by the new updated address at the appropriate point in each storage access cycle.

It should be noted that certain storage access instructions may not specify that the current storage address in register 30a be updated. In such cases, the extent checking mechanism works in exactly the same manner as described above, except that the updated address in the higher order Z register half 34a is not sent back to the SA register 30a.

The important advantage of the foregoing operation is that two distinct operations are performed during one and the same machine control cycle. The first operation is the adding of the current storage address to the access length value to obtain the new address. The second distinct operation is the subtracting of the new address produced by the first operation from the upper boundary limit to provide the boundary extent check. In the absence of the present invention, a second machine control cycle could be required to perform the boundary extent check.

It is noted that the described two-operation function is slightly slower than a one-pass add function since the subtraction used for the extent checking must wait on the outcome of the address update addition. This delay is caused by the inherent circuit delay inside the arithmetic unit 20 in performing the address update addition. It is, however, quite small in magnitude and does not lengthen the normal storage access cycle since the accessing of data into or out of storage also takes longer than a one-pass add function.

A further advantage of the present upper bound address checking system is its flexibility in handling access lengths of different sizes. Successive storage access instructions can specify different read lengths or write lengths and the address checking feature will continue to perform in the desired manner. In other words, the address checking circuitry is not limited to use with read lengths and write lengths having the same fixed value.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A boundary address checking system for checking a storage access request against a boundary address limit and comprising:
   parallel binary arithmetic circuitry having independent first and second arithmetic zones;
   update circuitry for supplying both the current storage address and a requested storage access length value to the first arithmetic zone for producing a new storage address representing the extent of the storage access request;
   and limit checking circuitry for supplying both the boundary limit address and the new address produced by the first arithmetic zone to the second arithmetic zone for producing an indication of whether the new address exceeds the boundary limit address.

2. A boundary address checking system for checking a storage access request against a boundary address limit and comprising:
   parallel binary arithmetic circuitry having a multiple number of parallel stages;
   control circuitry for subdividing the arithmetic circuitry into two zones and simultaneously operating such zones as independent first and second arithmetic units;
   update circuitry for supplying both the current storage address and a requested storage access length value to the first arithmetic unit for producing a new storage address representing the extent of the storage access request;
   and limit checking circuitry for supplying both the boundary limit address and the new address produced by the first arithmetic unit to the second arithmetic unit for producing an indication of whether the new address exceeds the boundary limit address.

3. A boundary address checking system in accordance with claim 2 wherein the limit checking circuitry is operative during the same machine control cycle as the update circuitry.

4. A boundary address checking system in accordance with claim 2 wherein the portion of the limit checking circuitry which supplies the new address to the second arithmetic unit operates in an asynchronous manner such that the new address is supplied to the second arithmetic unit as soon as it becomes available at the output of the first arithmetic unit.

5. A boundary address checking system in accordance with claim 2 and further including circuitry responsive to the carry-out signal for the second arithmetic unit for producing a boundary limit extent error signal when the new address exceeds the boundary limit address.

6. A boundary address checking system in accordance with claim 2 wherein the second arithmetic unit and the limit checking circuitry include circuitry for causing the complement of the new address to be added to the boundary limit address to produce the indication of whether the new address exceeds the boundary limit address.

7. Data processing circuitry for performing two serially related arithmetic/logic operations during one and the same machine control cycle and comprising:
   parallel binary arithmetic/logic circuitry having first and second arithmetic/logic zones;
   circuitry for supplying first and second operands to the first arithmetic/logic zone for producing a first result;
   and data transfer circuitry connected to the output of the first arithmetic/logic zone for immediately supplying the first result back to the input of the second arithmetic/logic zone for immediately producing a second and different result.

8. Data processing circuitry in accordance with claim 7 wherein the data transfer circuitry is constructed to operate in an asynchronous manner such that the first result is supplied back to the input of the second arithmetic/logic zone as soon as it becomes available at the output of the first arithmetic/logic zone.

9. Data processing circuitry in accordance with claim 7 wherein the data transfer action of the data transfer circuitry is not dependent on any timing signals.

10. Data processing circuitry in accordance with claim 7 wherein the data transfer circuitry is free of registers, latches and other mechanisms controlled by timing signals.

* * * * *